6299X
E. Lester,
Washing Machine,
Patented Dec. 20, 1830.
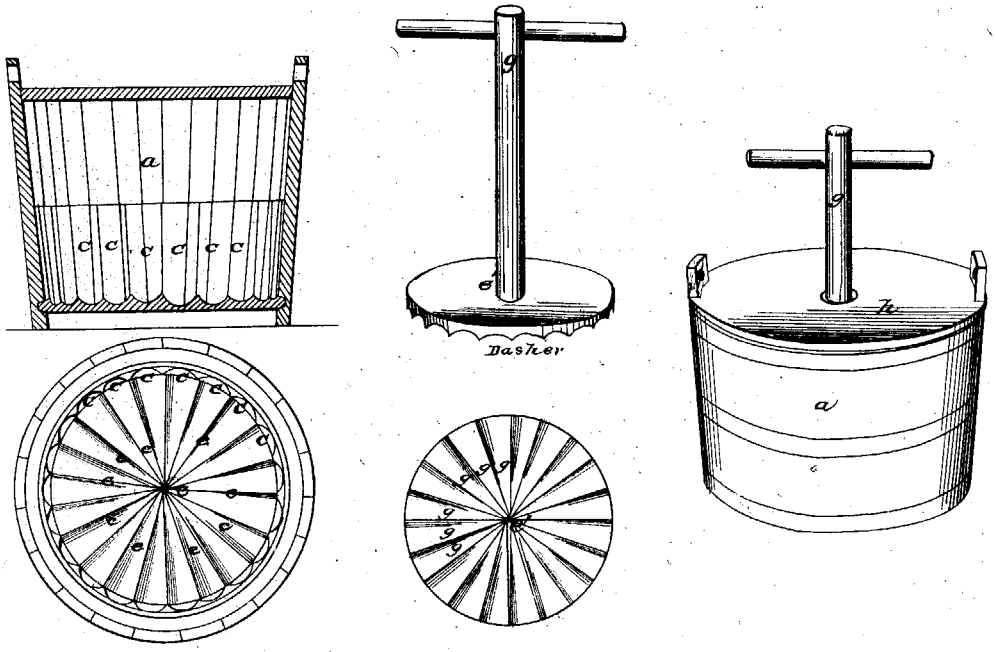
N. PETERS, PHOTO-LITHOGRAPHER, WASHINGTON, D. C.

Dec 20. 1830 307

Ebenezer Lester, of Killingworth. Connecticut. 6299X

Letters Patent.

The schedule referred to in these Letters Patent and making part of the same contain-
ing a description in the words of the said Ebenezer Lester himself of his improvement
in the washing Machine.

To all to whom these presents shall come.

Be it known that I Ebenezer Lester of Killingworth in the County of Mid-
dlesex and State of Connecticut, have invented a new and useful improvement
in the construction of Washing Machines, adapted to the washing of clothes,
sheets, blankets, curtains, and other articles of like kind. And that the following
is a full and exact description of the construction and operation of the said ma-
-chine as invented or improved by me. This improvement consists in, First, a
vessel which may be circular, octagonal, or square on the outside, but upon
the inside should be always circular. The inside of this vessel should be
fluted all round, or lined with fluted work, from the bottom upwards, six inches
or more as may be found convenient. The diameter of the inside of this vessel
on the bottom may be from one foot to two feet or more, as may be found neces-
-sary for family use, and the height of the vessel may be of from fourteen inches to three
feet as may be found convenient. The bottom of this vessel on the inside, should be
fluted, or covered with fluted work, The fluting should diverge from the centre
of the bottom increasing in width or diameter proportionally, and extending to the upright
fluting upon the inner periphery. Second a circular dasher fitted to the diameter
of the vessel, the underside of which dasher should be fluted, or fluted work may be
fastened upon its under side, and in either case the fluting should be constructed
so as to correspond with the fluting in the bottom of the vessel. Rollers may be sub-
stituted in the place of a part of the fluted work, if found more convenient.

A standard or upright piece should be fastened or secured to the centre of
the circular dasher, and should be as much longer than the depth of the vessel
as may be convenient and should pass through a hole of nearly the same di-
ameter in the cover. The cover should be secured in its place upon the top of
the vessel. On the top or upper end of the standard should be fastened a cross

308.

62[illegible]X bar at right angles with the standard, of convenient length, the ends of which should be properly shaped for handles. The clothes or things to be washed, should be placed in the vessel upon the circular dasher, with a sufficient quantity of water, and then the machine may be operated by a person turning the dasher, horizontally half, or quite round and back. By this means a great saving of time and labour will be effected without injury to the articles washed, as experiment has amply demonstrated.

The machine may be made of suitable wood, fastened in the usual way

The inventor does not thereby claim as his invention, vessels, fluted work, or rollers, but merely the manner of improving them, by uniting their operation in the mode above mentioned Witnesses Asa M. Bollet }

Austin Olcott. }

Ebenezer Lester 560 w[illegible]

Ent[illegible]

C.[illegible]